United States Patent

[11] 3,602,906

[72] Inventor John R. Wiegand
882 Balfour St., Valley Stream, N.Y. 11580

[21] Appl. No. 5,631
[22] Filed Jan. 26, 1970
[45] Patented Aug. 31, 1971

[54] MULTIPLE PULSE MAGNETIC MEMORY UNITS
10 Claims, 4 Drawing Figs.

[52] U.S. Cl. ...... 340/174 TW, 336/234, 340/174 JA, 340/174 PM
[51] Int. Cl. ...... G11c 11/12, H01f 27/26
[50] Field of Search ...... 340/174 TW; 335/229, 297; 336/234

[56] References Cited
UNITED STATES PATENTS
3,527,095 9/1970 Ichiro Wada ...... 335/297 X

*Primary Examiner*—James W. Moffitt
*Attorney*—Eward W. Goldstein, Esq.

ABSTRACT: A multiple pulse generator comprises a plurality of axially straight, prestretched wire segments uniformly twisted helically and enclosed in a dielectric body to form a cylindrical core. A wire coil is wound around the core. When a magnetic field of variably intensity impinges on the wires a series of pulses are generated in the coil. The magnetic field can be created by passing an electric current of varying magnitude through another coil wound on the core, or by moving laterally a permanent magnet disposed adjacent to the core.

INVENTOR.
John R. Wiegand
BY
Polachek & Saulsbury
ATTORNEYS

MULTIPLE PULSE MAGNETIC MEMORY UNITS

The present invention concerns a multiple pulse generator and a method of generating multiple pulses.

The present invention concerns improvements over those described in my prior U.S. Pat. No. 3,223,987, dated Dec. 14, 1969. Typically magnetic memory cores, such as those used in computers, are circular and are magnetized in a path along the circumference of the core in either a clockwise or counterclockwise direction. When a read signal is applied a logical "1" pulse is generated if the magnetomotive force produced by the read current opposes the previous magnetic path. If the magnetomotive force produced by the read current does not oppose the previous magnetic path, there will be no read pulse output and this is regarded as a logical "0." The prior memory cores can thus be used to indicate only two logical states.

The present invention is directed at a memory device including a magnetic core by means of which a large number of pulses can be read from the core, thus increasing the utility and versatility of the device. The core comprises a cylindrical bundle of specially processed wires. An impinging magnetic field is used to read the signal. A sensing coil wound on the core, picks up an electromotive force caused by sudden changes in flux intensity in the core. As the magnetic field is increased, a point will be reached where one of the wires snaps its magnetic domain into alignment with the impinging field. This action is regenerative within that individual wire so that the change in flux intensity (B) in the coil is sudden and relatively large. This output pulse then, is independing of the rate of sweep of the magnetic field intensity. The step function increase in the magnetic field intensity is accompanied by a corresponding drop in magnetomotive force (H) across the core. The sweep will then have to continue the same amount until it passes once again that magnetomotive force that caused the first wire to snap its magnetic domain into alignment with the impinging field. Shortly after this point, another one of the wires will snap its magnetic domain into alignment with the impinging field. This process continues until all of the wires in the core have aligned their magnetic domains, and therefore, all of the output pulses have been registered by the sensing coil. An important advantage of the invention is that a large predetermined number of output pulses can be derived from the core, determined by the number of wires in the core. The signal-to-noise ratio of the output pulses is quite high so that output pulses are picked up without ambiguity. Either positive or negative pulses can be obtained from the core depending on the direction (polarity) of the impinging magnetic field. The device is relatively simple in construction and employs components of high reliability The generation of readout pulses can be effected electronically or electromechanically by a pushbutton type of construction. The construction of the core is such that the number, shape, amplitude and separation of the readout pulse can all be positively predetermined.

The invention will be explained in further detail with reference to the drawings, wherein.

Figures 1, 2, 3, 4, 5:
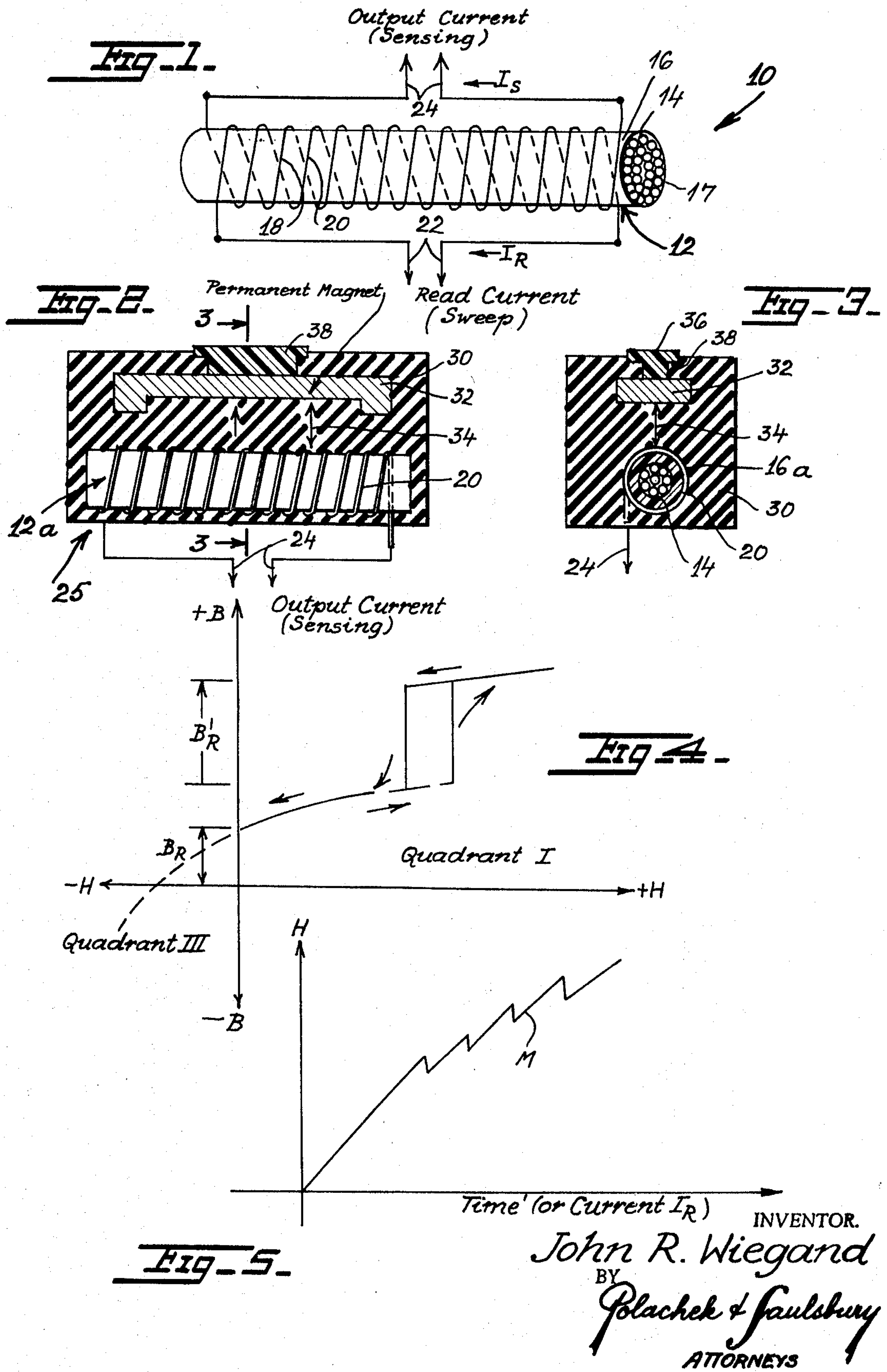
FIG. 1 is an oblique side view partially diagrammatic in form of one pulse generating device according to the invention.
FIG. 2 is a vertical longitudinal sectional view partially diagrammatic in form of another pulse generating device.
FIG. 3 is a cross-sectional view taken on line 2—2 of FIG. 2.
FIGS. 4 and 5 are graphic diagrams used in explaining the theory of operation of the invention.

Referring first to FIG. 1, there is shown a pulse generating magnetic memory device 10 including a cylindrical core 12. The core contains a multiplicity of axially straight parallel wires 14. The wires are permanently held together in a bundle embedding them in a strong dielectric body 16 which may be made of epoxy or other plastic or a suitable cement.

Surrounding the core are two conductive wire coils 18, 20 both wound in the same direction, extending the full length of the core, and insulated from each other. The coils have input and output terminals 22, 24 respectively. Coil 18 is used for applying a magnetizing field which provides the read in signal, and coil 20 senses reactions of the core wires and generates output current pulses.

The magnetic wires 14 of the core may be made of a nickel alloy and preferably have a nickel-iron content, with a higher percentage of nickel than iron. The following procedure may be used in making the core.

1. Fully annealed nickel-iron wire is stretched to obtain a set in length.
2. The wire is then twisted while tension is applied so that the wire assumes a helical form with an equally spaced turn.
3. The wire is then cut into segments of equal length, each equal to the length of core being made.
4. A number of cut wire segments 14 are then grouped together to form a cylindrical bundle. The number of wires 14 will be determined by and equal to the number of output pulses during each readout cycle.
5. The wires are then permanently bound together parallel to each other by embedding them in a suitable dielectric plastic body 15 other potting compound.
6. Opposite ends 17 of the core may then be ground to form smooth end surfaces.
7. Coils 18 and 20 made of copper wire are then wound on the core in the same direction and may be cemented in place.

FIG. 1 illustrates a memory device arranged for electronic operation. When output pulses are desired $I_R$ may be increased in a continuous fashion. This will induce a varying magnetomotive force in core 12, causing output current pulses $I_S$ to be generated in coil 24. As the absolute value of the read signal current $I_R$ is increased to just past the point where the first pulse is generated due to magnetic response of a single one of the wires 14, the current $I_R$ can be reversed so that no further pulses in the series will be read. The current $I_R$ can be increased continuously until all the output pulses which the device can be produced in a series have been generated. For proper operation, core 12 must be initially primed with larger than normal positive and negative currents in the read coil 18. Thereafter normal sweep currents may be used in read coils 18 to produce output pulses in coil 20.

FIGS. 2 and 3 show another embodiment of the invention which is electromechanical in operation. Memory device 25 includes cylindrical core **12*a* constructed and arranged like core 12 of FIG. 1, with a multiplicity of twisted, parallel wires 14 collected together to form a cylindrical bundle and held together permanently in a dielectric body 16*a*. The core is surrounded by a single sensing or pickup coil 20. The coil terminates in output terminals 24. The entire assembly of core and coil is then embedded in a flexible dielectric block 30. A permanent bar magnet 32 is also embedded in the block parallel to core 12*a* and spaced apart by a flexible section 34 of the block. A rigid button or plate 36 is inserted in a cavity 38 on top of the block and contacts magnet 32**.

When button 36 is depressed the spacing of magnet 32 from core **12*a* is changed as section 24 of the block flexes. A magnetic field then impinges on the core to create a magnetomotive force which activates the wires 14. As the magnetic domains of the magnetic wires align in succession with the impinging magnetic field, a series of output pulses is electromagnetically generated in pickup or sense coil 20. When the button 36** is released, the series of pulses is again generated.

The theory of operation will be described with reference to FIGS. 4 and 5. When a wire is helically twisted like each of wires 14, an easy path for magnetization is created. When this wire is initially magnetized or primed, all of the magnetic domains are aligned in a linear direction; but as the magnetomotive force H recedes, then at a particular point all of the domains snap into the helix pattern regeneratively, or as a chain reaction within the wire. This then amounts to a residual magnetism $B'_R$ in a helix form; see FIG. 4. A B-H plot is shown in FIG. 4 for a linear wire 14, where B is the flux intensity and H is the magnetomotive force. A hysteresis effect is shown in quadrant I. The same action can, however, be accomplished in the third quadrant where both B and H will be reversed after first priming with a full +H force.

No two wires 14 in core 12 or 12*a* will snap coincidentally because as one wire switches, it tends to short circuit the other wires in the core. This step effect is indicated by the step plot M of an entire core shown in FIG. 5. The positioning of the group of pulses with respect to the impinging field H caused by the sweep current $I_R$ or by pushing button 36, is determined primarily by the type of materials employed in the wires 14. The separation of the pulses within each group is a function principally of both the material of the wires and the amount of twist applied to the wire. The greater the number of turns per unit length of wire, the closer together will be the pulses. The magnitude of the change in flux $B_R$ indicated in FIG. 4, caused by the snap of magnetic domain into alignment with the impinging field, is in the main influenced by the amount of initial stretching of the wires prior to twisting.

To summarize, the invention has in general the following characteristics:

1. The magnetic flux flow switches between two different magnetic paths thereby creating an electromotive pulse i the sense coil.

2. This switch is caused by an impinging magnetomotive force field with directivity which is different from the easy quiescent field.

The magnetomotive force field can be generated electronically by sweeping a read current signal in the magnetic core, or the magnetomotive force field can be generated by varying the spacing between the core and a permanent magnet.

4. The switch of magnetic flux flow in a path occurs sharply and rapidly and is independent of the sweep rate of the read signal or the rate of change of separation between the core and magnet. 5. Due to the rapid switching, the signal-to-noise ratio in the sensing coil is quite high.

6. A series of output pulses are produced from a multiwire core because a multiplicity of magnetic switching actions occur.

7. The amplitude, separation, location and number of pulses in a series are all variable and determinable by the material of the wire, amount of twist, amount of stretch, etc.

8. The read signal sweep can be reversed at such a point that less than a full series of pulses are produced.

9. The magnetic switching phenomena traces a hysteresis path in one of two quadrants of a B–H plot of magnetization.

10. Either positive or negative output pulses can be generated from a core, and no two output pulses will occur simultaneously.

The memory devices described constitute information storage and readout units of high reliability. Each unit of a system may have identical circuitry and/or mounting fixtures, and physically equivalent cores, irrespective of the number or characteristics of the output multiplexing system where all of the pushbutton units feed one common wire and yet each unit will transmit distinctive signals. The units can be used in any magnetic core memory system or computer where it is desirable to read more than a logical "0" and logical "1" for a memory unit. If desired, fixtures containing the memory cores can be arranged so that individual magnetic cores mounted therein can be easily removed and replaced with others so that a different number of pulses can be obtained from each fixture. In fabricating the core it is possible to stretch and twist the wire segments individually before forming them into a cylindrical core.

What is claimed is:

1. A multiple pulse generator, comprising a plurality of axially straight magnetic wire segments of equal length, each wire being prestretched and uniformly twisted helically; a dielectric body securing the wires in a bundle in fixed positions laterally adjacent to each other to form a cylindrical core; and a conductive wire coil helically wound around the core, whereby a series of electrical pulses will be generated in the coil when the wires in the core are subjected to a magnetic field of gradually changing intensity, the maximum number of pulses in said series being equal to the number of wire segments in the core.

2. A multiple pulse generator as defined in claim 1, further comprising means adjacent to the core for creating said magnetic field.

3. A multiple pulse generator as defined in claim 2, wherein the last named means comprises another conductive wire coil wound around the core to create said magnetic field when an electric current of variable magnitude is passed through said other coil.

4. A multiple pulse generator as defined in claim 2 wherein the last named means comprises a permanent magnet spaced laterally from said core, and means for changing the spacing between the magnet and core for subjecting the core to the magnetic field of changing intensity.

5. A multiple pulse generator as defined in claim 1, further comprising a support for the core; a permanent magnet, means movably supporting the magnet with respect to the core; and means for moving the magnet laterally of the core to subject the core to the magnetic field of changing intensity.

6. A multiple pulse generator as defined in claim 1, further comprising a permanent magnet; a flexible dielectric block enclosing both said core and magnet with a magnet spaced laterally from the core, whereby a magnetic field maintained by the magnet sweeps the core when the magnet and core are moved relatively to each other inside said block.

7. A multiple pulse generator as defined in claim 6, further comprising a button on the block arranged to move the magnet laterally with respect to the core.

8. A method for generating a series of pulse, comprising the steps of stretching and twisting under tension a plurality of magnetic wire segments; assembling the wire segments into a bundle; enclosing the segments in a dielectric body to form a cylindrical core; winding a conductive wire coil around the core; and subjecting the wire segments in the core to a magnetic field of changing intensity to generate a series of electrical pulses in said coil.

9. A method for generating a series of pulses as defined in claim 8, wherein the step of subjecting the wire segments to said magnetic field comprises the further steps of placing a permanent magnet adjacent to the core; and varying the spacing between the magnet and core so that the magnetic field maintained by the magnet sweeps the core with variable intensity while said spacing is being varied.

10. A method for generating a series of pulses as defined in claim 8, wherein the step of subjecting the wire segments to said magnetic field comprises the further steps of winding another conductive wire coil around the core; and passing an electric current of variable magnitude through said other coil to generate said magnetic field of changing intensity.